US009534492B2

(12) United States Patent
Khajeh et al.

(10) Patent No.: US 9,534,492 B2
(45) Date of Patent: Jan. 3, 2017

(54) PRESSURE COMPENSATED CAPACITIVE MICROMACHINED ULTRASOUND TRANSDUCER FOR DOWNHOLE APPLICATIONS

(71) Applicant: Baker Hughes Incorporated, Houston, TX (US)

(72) Inventors: Ehsan Khajeh, Spring, TX (US); Valiallah Zomorrodian, Houston, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 158 days.

(21) Appl. No.: 14/538,374

(22) Filed: Nov. 11, 2014

(65) Prior Publication Data
US 2016/0130936 A1    May 12, 2016

(51) Int. Cl.
*E21B 47/14* (2006.01)
*E21B 49/00* (2006.01)
*B06B 1/02* (2006.01)

(52) U.S. Cl.
CPC ............ *E21B 47/14* (2013.01); *B06B 1/0292* (2013.01); *E21B 49/00* (2013.01); *G01V 2210/1299* (2013.01); *G01V 2210/1429* (2013.01)

(58) Field of Classification Search
CPC ........ E21B 47/14; E21B 49/00; B06B 1/0292; G01V 2210/1429; G01V 2210/1299
USPC ............ 367/25, 172, 174; 310/322–330, 334
See application file for complete search history.

(56) References Cited

U.S. PATENT DOCUMENTS

| 4,996,675 A * | 2/1991 | Beauducel ............ B06B 1/0685 310/337 |
| 6,504,795 B1 * | 1/2003 | Niederer .............. G10K 11/168 367/162 |
| 8,089,828 B2 * | 1/2012 | Fischer .................. H04R 19/04 367/181 |

FOREIGN PATENT DOCUMENTS

FR    1556791 A *    2/1969    ........... C07D 457/02

OTHER PUBLICATIONS

"General Description and Advantages of CMUTS", Khuri-Yakub Ultrasonics Group, Maintained by Moini & Oralkan, 2 pages.
Choe, "Volumetric Real-Time Imaging Using a CMUT Ring Array", IEEE Trans Ultrason Ferroelectr Freq Control. Author manuscript; available in PMC Aug. 10, 2012, 29 pages.
Cianci, L. V. 2003, "Improvements towards a reliable fabrication process for cMUT", Microelectronic Engineering 67-68, p. 602-608.

(Continued)

*Primary Examiner* — Daniel L Murphy
(74) *Attorney, Agent, or Firm* — Cantor Colburn LLP

(57) ABSTRACT

An apparatus for interrogating a subsurface material includes a carrier configured to be conveyed through a borehole penetrating the earth, an array of acoustic transducers disposed on the carrier and configured to be compensated for ambient pressure in the borehole, and electronics coupled to the array and configured to operate the array to interrogate the subsurface material. Each acoustic transducer in the array includes a substrate, a bottom electrode disposed on the substrate, a top electrode disposed above the bottom electrode, an insulation layer disposed between the bottom electrode and the top electrode and defining a cavity into which the top electrode may deflect, and a pressure compensating fluid disposed in the cavity and in pressure communication with ambient pressure of the array.

18 Claims, 6 Drawing Sheets

(56) References Cited

OTHER PUBLICATIONS

DeBoer, "Micromachining of Buried Micro Channels in Silicon", Journal of Microelectromechanical Systems, vol. 9, No. 1, Mar. 2000, pp. 94-103.
Eames, (2011), "FEA Modeling of CMUT With Membrane Stand-Off Structures to Enable Selectable Frequency-Mode Operation", IEEE Transactions on Ultrasonics Ferroelectrics and Frequency Control, vol. 58, No. 12, pp. 2749-2752.
Ho, "FEA of CMUTs Suitable for Wide Gas Pressure Range Applications", Proc IEEE Ultrason Symp. Author manuscript; available in PMC Aug. 24, 2011, Published in final edited form as: Proc IEEE Ultrason Symp. Oct. 11, 2010; 2010: 1234-1237. doi:10.1109/.
Wygant, "Integration of 2D CMUT Arrays with Front-End Electronics for VolumetricUltrasound Imaging", IEEE transactions on Ultrasonics, Ferroelectrics, and Frequency Control, vol. 55, No. 2, Feb. 2008, pp. 327-342.
Wygant et al.; "An Integrated Circuit With Transmit Beamforming Flip-Chip Bonded to a 2-D CMUT Array for 3-D Ultrasound Imaging";(2009); IEEE; 12 pages.

* cited by examiner

PRESSURE COMPENSATED CAPACITIVE MICROMACHINED ULTRASOUND TRANSDUCER FOR DOWNHOLE APPLICATIONS

BACKGROUND

Earth formations may be used for various purposes such as hydrocarbon production, geothermal production, and carbon dioxide sequestration. In order to efficiently use an earth formation, the formation is characterized by performing measurements of many different properties using one or more tools conveyed through a borehole penetrating the formation. One category of tools is acoustic tools that use sound waves to perform various measurements such as imaging a wall of the borehole or measuring rugosity of the borehole. An acoustic tool includes one or more acoustic transducers that convert electrical energy into sound wave energy to transmit an acoustic signal or convert sound wave energy into electrical energy to receive an acoustic signal. Some transducers may be used to both transmit and receive an acoustic signal.

One type of acoustic transducer is based on piezoelectric material technology. Unfortunately, there are some disadvantages to using piezoelectric transducers downhole. Due to the characteristics of piezoelectric materials, piezoelectric transducers require a large size in comparison to the space available in a tool sized to fit in a borehole that is typically inches in diameter. Consequently, the number of piezoelectric transducers that may be used in a tool may be constrained leading to lower accuracy or resolution than if more transducers were used in the tool. Another disadvantage to using piezoelectric transducers downhole, where temperatures can be as high as 300° C., is that piezoelectric materials start to depole at temperatures above 150° C. and their performance is degraded significantly during extended operation at high temperatures. Hence, it would be well received in the drilling industry if smaller acoustic transducers that could operate at high downhole temperatures would be developed.

BRIEF SUMMARY

Disclosed is an apparatus for interrogating a subsurface material. The apparatus includes: a carrier configured to be conveyed through a borehole penetrating the earth; an array of acoustic transducers disposed on the carrier and configured to be compensated for ambient pressure in the borehole; and electronics coupled to the array and configured to operate the array to interrogate the subsurface material, wherein each acoustic transducer in the array comprises: a substrate; a bottom electrode disposed on the substrate; a top electrode disposed above the bottom electrode, an insulation layer disposed between the bottom electrode and the top electrode and defining a cavity into which the top electrode may deflect; and a pressure compensating fluid disposed in the cavity and in pressure communication with ambient pressure of the array.

Also disclosed is a method for interrogating a subsurface material. The method includes: conveying a carrier through a borehole penetrating the subsurface material; operating an array of acoustic transducers disposed on the carrier and that are configured to emit an acoustic signal into the borehole and receive an acoustic return signal from the borehole using electronics configured to operate the array to interrogate the subsurface material, wherein each acoustic transducer in the array includes: a substrate; a bottom electrode disposed on the substrate; a top electrode disposed above the bottom electrode, an insulation layer disposed between the bottom electrode and the top electrode and defining a cavity into which the top electrode may deflect; and a pressure compensating fluid disposed in the cavity and in pressure communication with ambient borehole pressure at the array; and communicating the ambient borehole pressure at the array to the pressure compensating fluid in the cavity to pressure balance each of the acoustic transducers in the array with the ambient borehole pressure.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method presented herein by way of exemplification and not limitation with reference to the figures.

Disclosed are apparatus and method for acoustically interrogating a downhole material such as an earth formation or a borehole fluid. The term "interrogating" relates to evaluating the earth formation such as by measuring a property or parameter of the earth formation. An array of pressure compensated capacitive micromachined ultrasound transducers is used to transmit a sound wave or acoustic signal into the downhole material and to receive a return acoustic signal due to interaction of the transmitted acoustic signal with the downhole material. By measuring the time of flight of the acoustic signal and/or the ratio of the amplitude of the received acoustic signal to the amplitude of the transmitted acoustic signal, one or more properties of the downhole material may be estimated. The array is micromachined from a substrate to produce transducers having dimensions on the order of tens of microns. This provides an array having a large number of transducers to provide increased accuracy and resolution and still satisfy the spatial constraints of a downhole tool. Because ambient pressure in a borehole at the deep depths usually encountered can be very high, the transducers are pressure compensated or pressure balanced about a transducer element that flexes to produce or receive an acoustic signal. Without pressure compensation, the extreme pressure would inhibit flexing of the transducer element and thus operation of the transducer.

Figure 1:
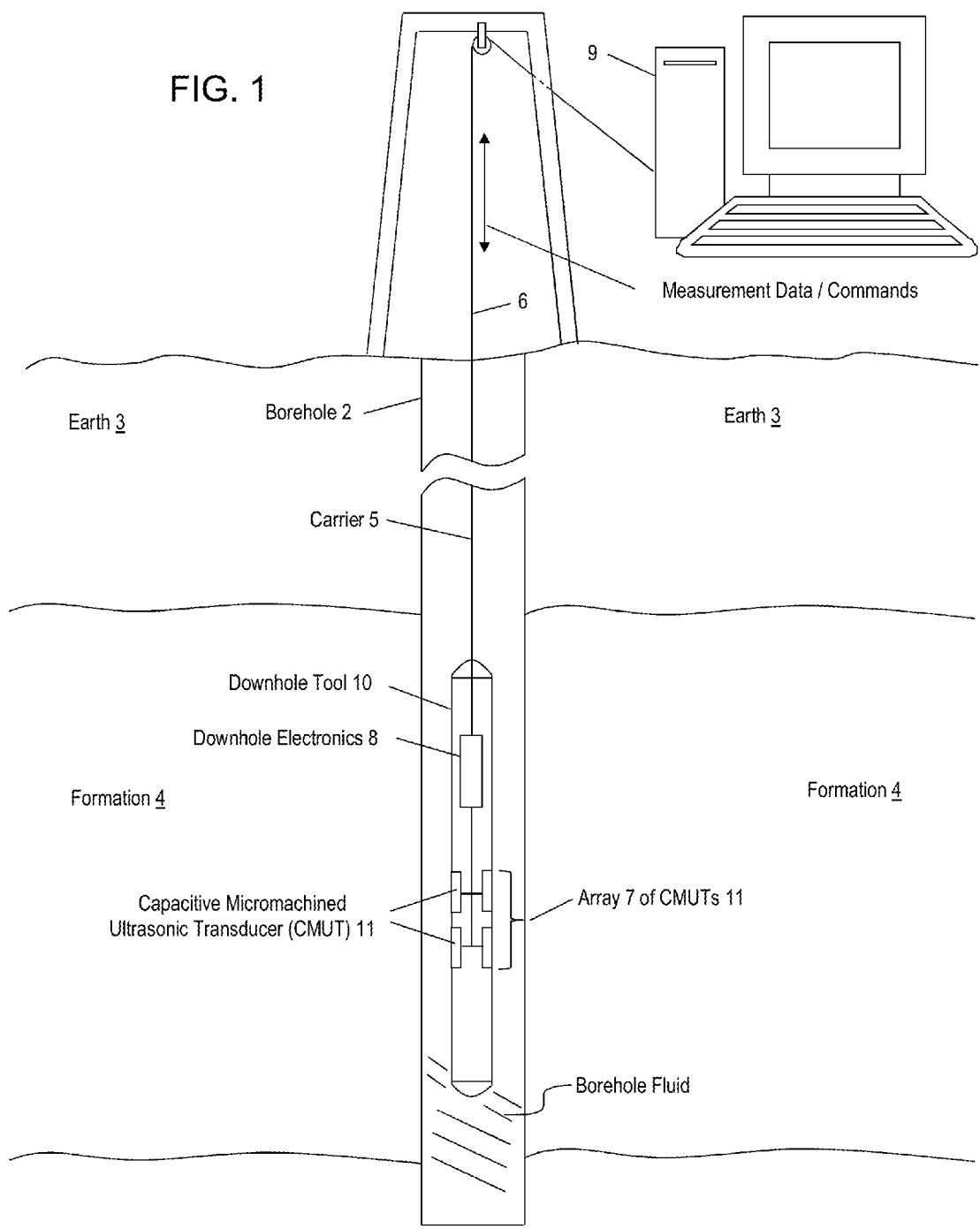
FIG. 1 illustrates a cross-sectional view of an exemplary embodiment of a downhole tool disposed in a borehole penetrating the earth.

FIG. 1 illustrates a cross-sectional view of an exemplary embodiment of an acoustic downhole tool 10 disposed in a borehole 2 penetrating the earth 3, which may include an earth formation 4. The formation 4 represents any subsurface material of interest that may be sensed by the tool 10. The term "subsurface material" may be used to refer to any material below the surface of the earth 3, such as the formation 4, a formation fluid or solid, and a borehole material, as non-limiting examples. The downhole tool 10 is conveyed through the borehole 2 by a carrier 5. In the embodiment of FIG. 1, the carrier 5 is an armored wireline 6. Besides supporting the downhole tool 10, the wireline 6 can provide communications (i.e., telemetry) between the downhole tool 10 and a computer processing system 9 disposed at the surface of the earth 3. Communications can include sending measurements uphole to the computer processing system 9 or commands downhole to the downhole tool 10. In order to operate the downhole tool 10, process measurement data, and/or provide a communications interface with the surface computer processing system 9, the downhole tool 10 includes downhole electronics 8. The operating and processing functions of the disclosure may be performed by the downhole electronics 8, the computer processing system 9, or a combination thereof. In an alternative embodiment referred to as logging-while-drilling (LWD) or measurement-while-drilling (MWD), the carrier 5 can be a drill string or drill tubular. In wireline, LWD, or MWD embodiments, measurement data may be downloaded in real time or after the downhole tool 10 is retrieved from the borehole 2. Non-limiting embodiments of the telemetry for LWD or MWD embodiments include pulsed-mud and wired drill pipe. The downhole tool 10 may be operated continuously or at discrete selected depths in the borehole 2.

The acoustic downhole tool 10 includes an array 7 of acoustic transducers 11. Each of the transducers 11 is a capacitive micromachined ultrasonic transducer (CMUT) that is pressure compensated. The function of the transducer is to convert an electrical signal into an acoustic signal (i.e., sound waves) and/or convert an acoustic signal into an electrical signal. The electrical signals may be provided by or received and processed by electronics such as the downhole electronics 8 or the computer processing system 9.

Figure 2:
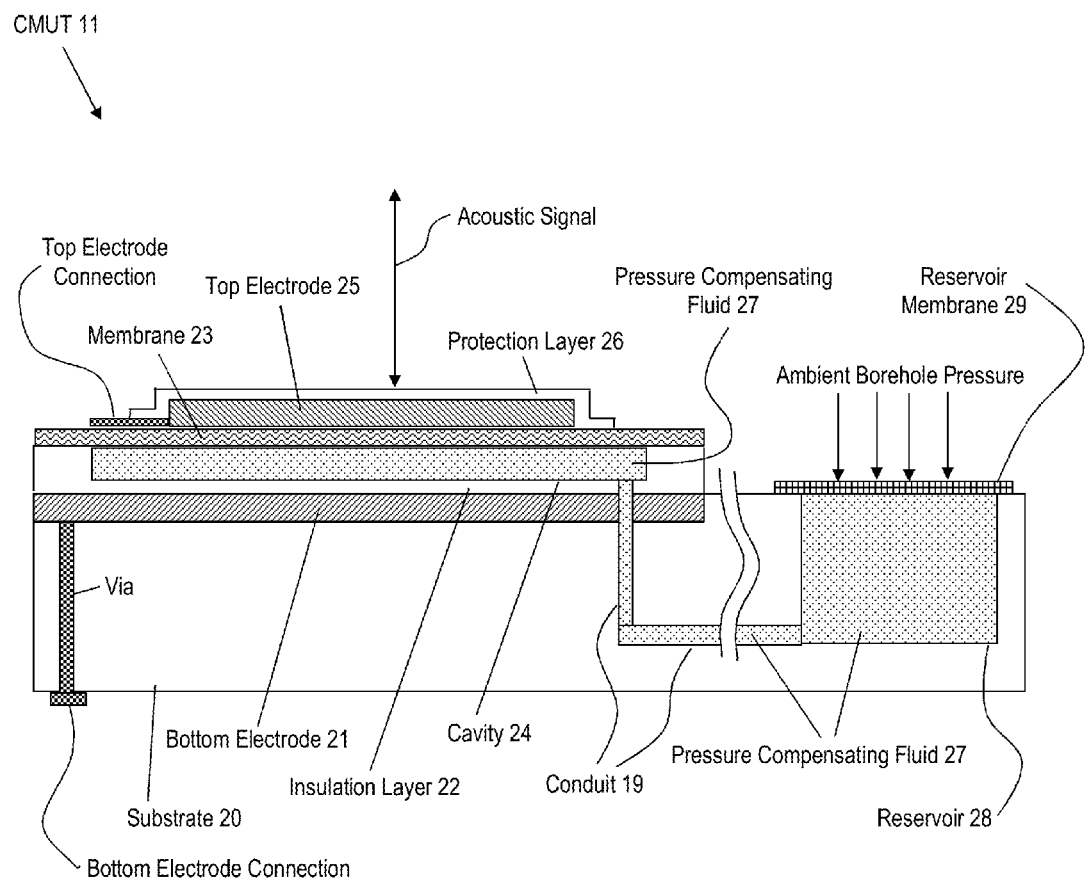
FIG. 2 depicts aspects of a pressure compensated capacitive micromachined ultrasound transducer (CMUT)

Refer now to FIG. 2, which depicts aspects of one CMUT 11 in the array 7. The CMUT 11 is micromachined from a substrate 20, which can be silicon in one or more embodiments. The micromachining is performed using techniques known in the art of fabricating micro-electrical-mechanical systems (MEMS). Disposed on the substrate 20 is a bottom electrode 21, which can be doped polysilicon in one or more embodiments. Disposed on the bottom electrode 21 is an insulation layer 22, which can be silicon oxide in one or more embodiments. Disposed on the insulation layer 22 is a membrane 23. The membrane 23 and the isolation layer 22 define a cavity 24. Disposed on the membrane 23 is a top electrode 25, which can be a metal such as aluminum in one or more embodiments. Disposed on the top electrode 25 is a protection layer 26 that provides protects the top electrode from abrasion from borehole materials. The protection layer 26 can be any material strong enough to withstand abrasion and be transparent to acoustic signals. The combination of the bottom electrode 21 and the top electrode 25 provides a capacitive structure. The top electrode 25 is configured to elastically deflect or flex into the cavity 24 when an alternating current of frequency f is applied to these electrodes in order to transmit an acoustic signal of frequency f. Alternatively, the top electrode 25 is configured to elastically deflect or flex at frequency f when receiving an acoustic signal of frequency f changing the capacitance at frequency f and generating an electrical signal of frequency f. In one or more embodiments, each CMUT 11 may be configured to operate at a frequency within the range of 100 kHz to 70 MHz, a dynamic range of 130 dB/Volt, a maximum output pressure of 35 kPa/Volt, and a receive sensitivity of 50 dB/Pa/Hz.

As noted above, the CMUTs 11 are pressure compensated in order to operate at the extreme ambient pressures present in the borehole at deep depths. Pressure compensation is achieved by disposing a pressure compensating fluid 27 in the cavity 24 that is in pressure communication with the ambient pressure in the borehole surrounding the array 7. In one or more embodiments, the pressure compensating fluid 27 is a low-viscosity oil. The pressure communication with the ambient pressure may be achieved using a conduit 19 that is filled with the pressure compensating fluid 27. The conduit 19 may be in pressure communication with a reservoir 28 containing the pressure compensating fluid 27. A reservoir membrane 29 may cover an opening of the reservoir 28 that is open to the ambient pressure in order to contain the pressure compensating fluid 27 within the reservoir 28 and yet communicate the ambient pressure to the reservoir 28. In one or more embodiments, the reservoir membrane 28 may be made of a flexible elastomer, rubber, or other material having similar properties and being able to withstand the high downhole temperatures. It can be appreciated that the reservoir 28 may serve a plurality of CMUTs 11 and be located in a region not subject to the full intensity of the transmitted or received acoustic signals in order to eliminate or reduce an effect of the acoustic signals on the reservoir and thus the cavity 24. In addition, the conduit 19 may be formed using micromachining techniques so that the conduit diameter is small compared to the diameter of the cavity 24 to also eliminate or reduce an effect of the acoustic signals on the pressure compensating fluid 27 in the cavity 24. Techniques for fabricating the conduit 19 include bulk micromachining and wafer bonding, surface micromachining, and buried channel technology as known in the MEMS art.

Regarding the membrane 23, it is configured to deflect or flex into the cavity 24 along with the top electrode 25 when the top electrode deflects or flexes into the cavity 24. The membrane 23 is also configured to keep the pressure compensating fluid 27 contained in the cavity 24 to prevent leakage. In one or more embodiments, the membrane 23 is made of silicon nitride ($Si_3N_4$). It can be appreciated that in one or more embodiments, the membrane 23 may not be required with the top electrode 25 being also configured to contain the pressure compensating fluid 27 in the cavity 24.

Figure 3:
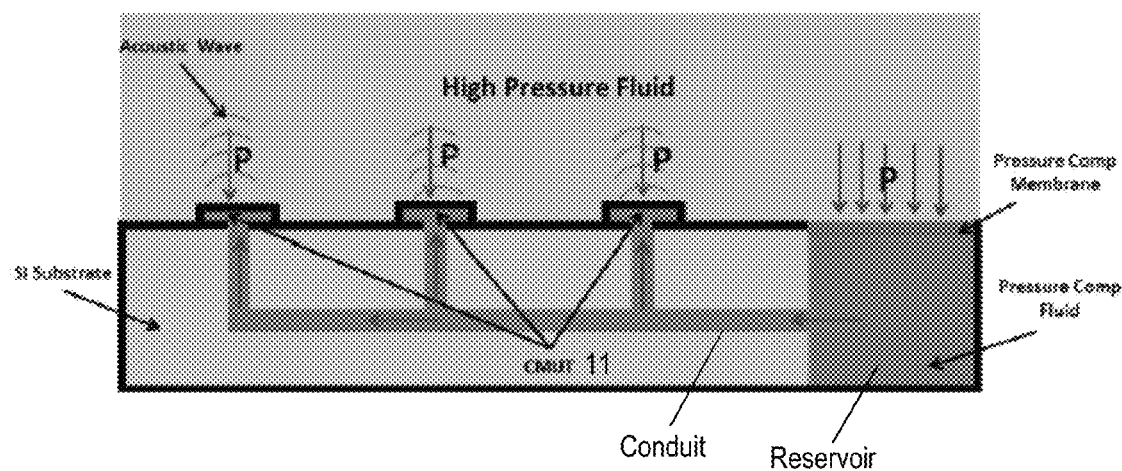
FIG. 3 depicts aspects of a plurality of CMUTs having a common pressure compensating reservoir.

Referring now to FIG. 3, one embodiment of the array 7 of CMUTs 11 is depicted. In this embodiment, one reservoir 28 is in pressure communication with three CMUTs 11. It can be appreciated that one reservoir 28 may be configured to serve all of the CMUTs 11 in the array 7 or that the CMUTs 11 in the array may be divided into groups with each group being served by a different reservoir 28. It can be appreciated that FIG. 3 along with FIG. 2 may not be to scale and that in one or more embodiments the reservoir may be on a macroscopic scale while the each of the CMUTs may be on a microscopic scale. In addition, the reservoir may not be located close to the CMUTs that the reservoir is serving.

Figure 4:
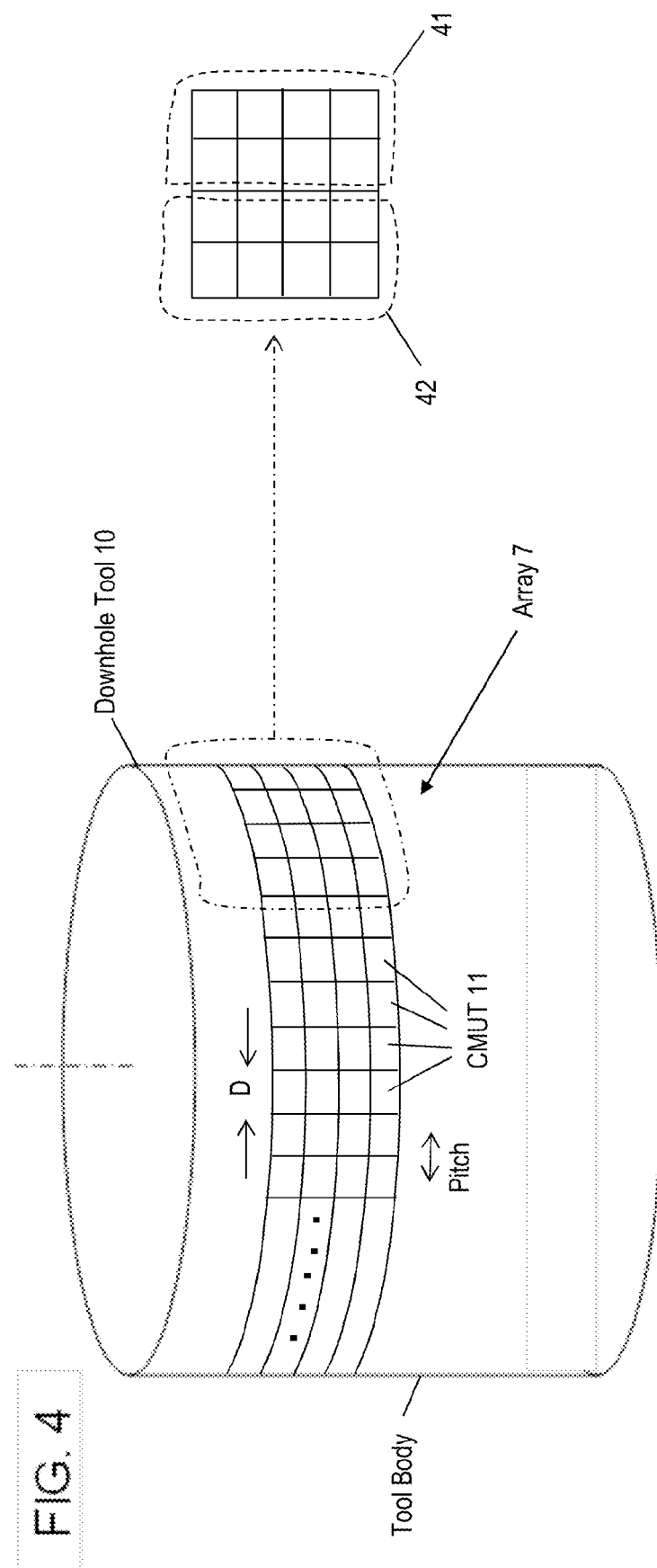
FIG. 4 depicts aspects of a circular linear array of CMUTs.
Figure 5:
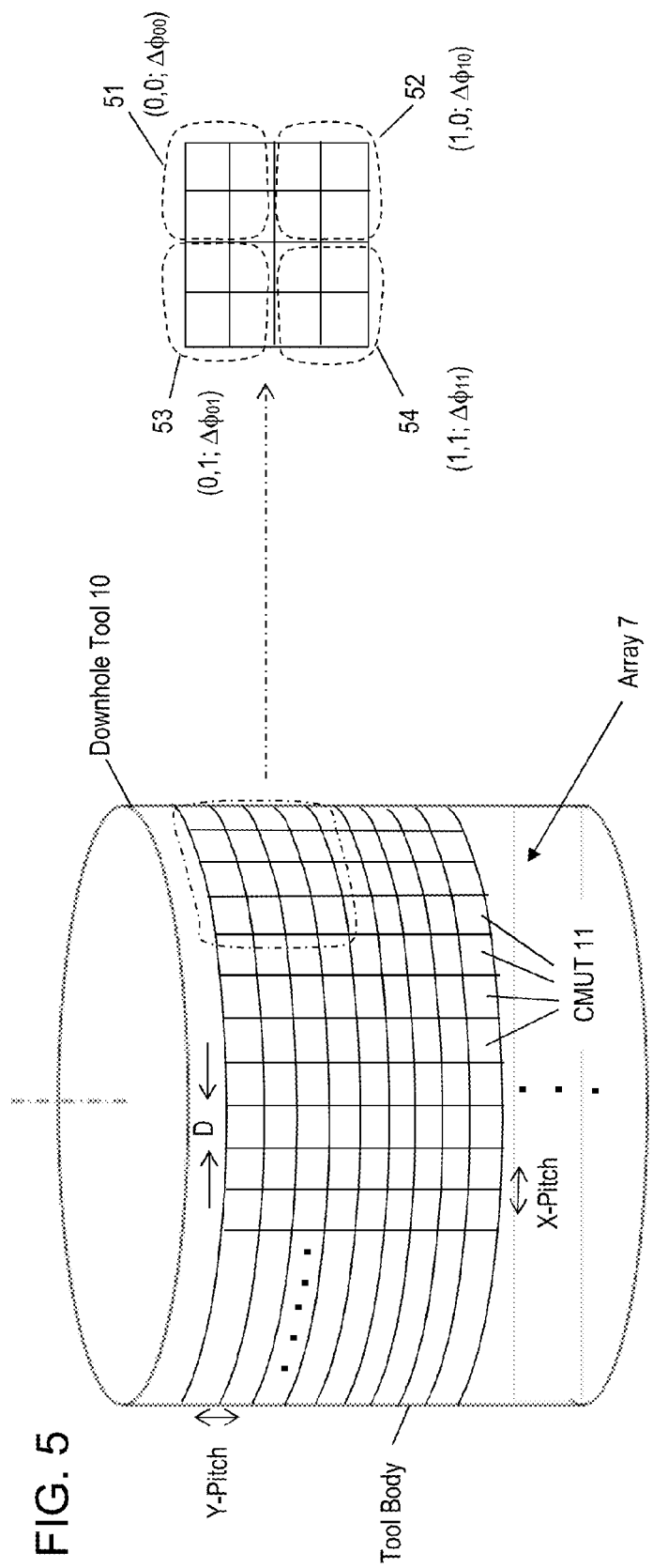
FIG. 5 depicts aspects of a circular two dimensional array of CMUTs.

The array 7 of CMUTs 11 can have any of several forms or combination of forms. In the embodiment illustrated in FIG. 4, the CMUTs 11 are disposed is a circular linear array about the circumference of the body the downhole tool 10. A first sub-array 41 of CMUTs 11 has a same first phase while an adjacent or neighboring second sub-array 42 has a second phase, which is equal to the first phase $\phi_1$ plus a differential phase ($\Delta\phi$). Each CMUT in a sub-array in acts in unison with the other CMUTs in the same sub-array. In the embodiment illustrated in FIG. 5, the CMUTs 11 are disposed in a circular two-dimensional array about the circumference of the body the downhole tool 10. It can be appreciated that the array 7 may formed by a plurality of sub-arrays (e.g., sub-arrays 51-54) where each sub-array is disposed on a flat chip having a small enough dimension such that the sub-arrays may be assembled to form a circle having the circumference of the downhole tool. In FIG. 5, sub-array 51 is located at X-Y coordinates (0, 0) and has a phase that is a reference phase plus $\Delta\phi_{00}$. It can be appreciated that the two-dimensional array providing for a phase difference in sub-arrays along both the X and Y directions may form a phased array and thus be used for beam focusing and steering applications. In other embodiments, the array 7 may not fully encircle the downhole tool 10, but may be aimed primarily in one direction such as to measure the sound velocity of a borehole fluid.

Because the array 7 may be fabricated by micromachining, the diameter of each CMUT 11 and the spacing between adjacent CMUTs 11 may be may be made very small. In one or more embodiments, a diameter D of one CMUT 11 may be in the range of 10-20 microns and the center-to-center spacing (pitch) between adjacent CMUTs 11 may be in the range of 40-50 microns. In other embodiments, the diameter may be as large as 1000 microns with a commensurately larger pitch. It can be appreciated that the selected diameter and the selected spacing may be dependent on the selected frequency of operation with lower frequencies requiring a larger diameter. In one or more embodiments, a group of CMUTs may be operated in parallel in order to achieve a selected response characteristic at a desired frequency.

Figure 6:
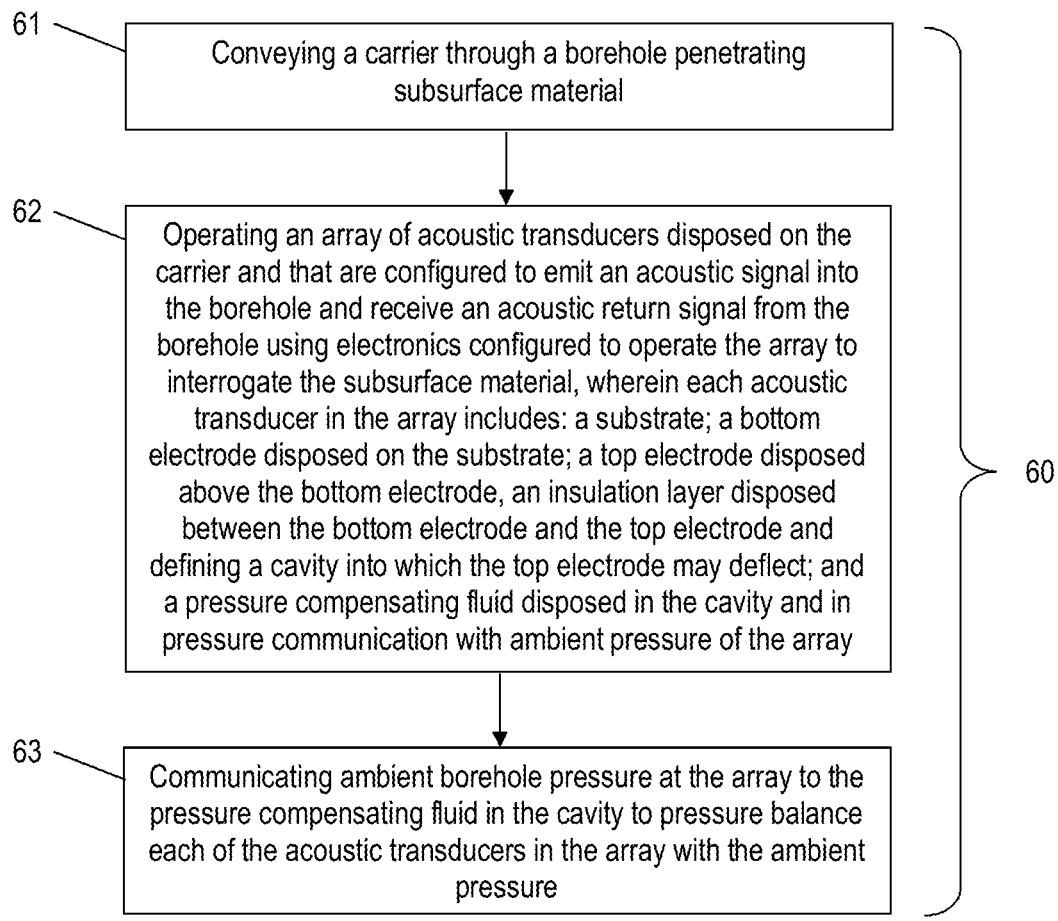
FIG. 6 is a flow chart of a method for interrogating a subsurface material.

FIG. 6 is a flow chart for a method 60 for interrogating a subsurface material. Block 61 calls for conveying a carrier through a borehole penetrating the subsurface material. Block 62 calls for operating an array of acoustic transducers disposed on the carrier and that are configured to emit an acoustic signal into the borehole and receive an acoustic return signal from the borehole using electronics configured to operate the array to interrogate the subsurface material. Each acoustic transducer in the array includes: a substrate; a bottom electrode disposed on the substrate; a top electrode disposed above the bottom electrode, an insulation layer disposed between the bottom electrode and the top electrode and defining a cavity into which the top electrode may deflect; and a pressure compensating fluid disposed in the cavity and in pressure communication with ambient borehole pressure at the array. Block 63 calls for communicating the ambient borehole pressure at the array to the pressure compensating fluid in the cavity to pressure balance each of the acoustic transducers in the array with the ambient borehole pressure.

The above disclosed techniques provide several advantages especially when compared to prior art piezoelectric transducers. One advantage as noted above is that the array of CMUTs can be made very small compared to the prior art piezoelectric transducers so that more transducers can be disposed in the limited space available in the downhole tool due to the confines of the borehole. The increase in the number of transducers may lead to increased accuracy, precision, and speed of taking measurements. Another advantage is that the CMUT may have a bandwidth that is 170% the bandwidth of the prior art piezoelectric transducer.

In support of the teachings herein, various analysis components may be used, including a digital and/or an analog system. For example, the downhole electronics 8 or the computer processing system 9 may include digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply (e.g., at least one of a generator, a remote supply and a battery), cooling component, heating component, magnet, electromagnet, sensor, electrode, transmitter, receiver, transceiver, antenna, controller, optical unit, electrical unit or electromechanical unit may be included in support of the various aspects discussed herein or in support of other functions beyond this disclosure.

The term "carrier" as used herein means any device, device component, combination of devices, media and/or member that may be used to convey, house, support or otherwise facilitate the use of another device, device component, combination of devices, media and/or member. Other exemplary non-limiting carriers include drill strings of the coiled tube type, of the jointed pipe type and any combination or portion thereof. Other carrier examples include casing pipes, wirelines, wireline sondes, slickline sondes, drop shots, bottom-hole-assemblies, drill string inserts, modules, internal housings and substrate portions thereof.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms. The term "configured" relates one or more structural limitations of a device that are required for the device to perform the function or operation for which the device is configured. The terms "first" and "second" do not denote a particular order, but are used to distinguish different elements.

The flow diagram depicted herein is just an example. There may be many variations to this diagram or the steps (or operations) described therein without departing from the spirit of the invention. For instance, the steps may be performed in a differing order, or steps may be added, deleted or modified. All of these variations are considered a part of the claimed invention.

While one or more embodiments have been shown and described, modifications and substitutions may be made thereto without departing from the spirit and scope of the invention. Accordingly, it is to be understood that the present invention has been described by way of illustrations and not limitation.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for interrogating a subsurface material, the apparatus comprising:
    a carrier configured to be conveyed through a borehole penetrating the earth;
    an array of acoustic transducers disposed on the carrier and configured to be compensated for ambient pressure in the borehole; and
    electronics coupled to the array and configured to operate the array to interrogate the subsurface material,
    wherein each acoustic transducer in the array comprises: a substrate; a bottom electrode disposed on the substrate; a top electrode disposed above the bottom electrode, an insulation layer disposed between the bottom electrode and the top electrode and defining a cavity into which the top electrode may deflect; and a pressure compensating fluid disposed in the cavity and in pressure communication with ambient pressure of the array.

2. The apparatus according to claim 1, further comprising a reservoir of the pressure compensating fluid in pressure communication with the ambient pressure of the array.

3. The apparatus according to claim 2, further comprising a reservoir membrane covering an opening of the reservoir to the ambient pressure and being configured to contain the pressure compensating fluid within the reservoir.

4. The apparatus according to claim 2, wherein a single reservoir is in pressure communication with a plurality of acoustic transducers in the array.

5. The apparatus according to claim 2, further comprising a conduit connecting the cavity to the reservoir.

6. The apparatus according to claim 5, wherein the conduit is formed by the substrate.

7. The apparatus according to claim 1, further comprising a cavity membrane disposed between the top electrode and the cavity.

8. The apparatus according to claim 1, further comprising a protection membrane disposed on the top electrode and configured to insulate the electrode from the ambient environment.

9. The apparatus according to claim 1, wherein the carrier comprises a downhole tool and the array is a circular linear array wrapped around a circumference of the tool.

10. The apparatus according to claim 1, wherein the array is a two-dimensional array.

11. The apparatus according to claim 1, wherein center to center spacing of the acoustic transducers in the array is less than 1 millimeter.

12. The apparatus according to claim 1, wherein center to center spacing of the acoustic transducers in the array is less than 50 microns.

13. The apparatus according to claim 1, wherein the subsurface material is an earth formation.

14. The apparatus according to claim 1, wherein the subsurface material is a fluid disposed in the borehole.

15. The apparatus according to claim 1, wherein the carrier comprises at least one of a wireline, a slickline, a drill string, and coiled tubing.

16. A method for interrogating a subsurface material, the method comprising:
    conveying a carrier through a borehole penetrating the subsurface material;
    operating an array of acoustic transducers disposed on the carrier and that are configured to emit an acoustic signal into the borehole and receive an acoustic return signal from the borehole using electronics configured to operate the array to interrogate the subsurface material, wherein each acoustic transducer in the array comprises: a substrate; a bottom electrode disposed on the substrate; a top electrode disposed above the bottom electrode, an insulation layer disposed between the bottom electrode and the top electrode and defining a cavity into which the top electrode may deflect; and a pressure compensating fluid disposed in the cavity and in pressure communication with ambient borehole pressure at the array; and
    communicating the ambient borehole pressure at the array to the pressure compensating fluid in the cavity to pressure balance each of the acoustic transducers in the array with the ambient borehole pressure.

17. The method according to claim 16, wherein communicating comprises using a conduit connecting the cavity to a reservoir containing the pressure compensating fluid.

18. The method according to claim 17, wherein communicating further comprises using a reservoir membrane to transmit the ambient pressure to the reservoir, the reservoir membrane covering an opening of the reservoir to the ambient pressure and being configured to contain the pressure compensating fluid within the reservoir.

* * * * *